Jan. 24, 1950 L. E. ASKE 2,495,218
SECTION FOR STATOR CORES FOR INDUCTION MOTORS
Filed Sept. 28, 1946 3 Sheets-Sheet 1

INVENTOR:-
LEONARD E. ASKE
BY Arthur R. Wylie
ATTY.

Jan. 24, 1950 L. E. ASKE 2,495,218
SECTION FOR STATOR CORES FOR INDUCTION MOTORS
Filed Sept. 28, 1946 3 Sheets-Sheet 2

INVENTOR:-
LEONARD E. ASKE
BY Arthur R. Wylie
ATTY.

Jan. 24, 1950     L. E. ASKE     2,495,218
SECTION FOR STATOR CORES FOR INDUCTION MOTORS
Filed Sept. 28, 1946     3 Sheets-Sheet 3

INVENTOR.-
LEONARD E. ASKE
BY *Arthur R. Wylie*
ATTY

Patented Jan. 24, 1950

2,495,218

UNITED STATES PATENT OFFICE 2,495,218

SECTION FOR STATOR CORES FOR INDUCTION MOTORS

Leonard E. Aske, Minneapolis, Minn., assignor to General Mills, Inc., a corporation of Delaware Application September 28, 1946, Serial No. 700,140

8 Claims. (Cl. 171—252)

1

I have invented a pancake type induction motor having a stator core made up of a number of laminated sections or prisms, preferably eight in number, secured together so that the base portion will have good magnetic continuity to form a polygon preferably by a clamping ring, each section being made up of a number of laminations riveted together and having suitable slots for the reception of field coils or windings of the motor.

An object of this invention is the provision of a built-up section or prism of this kind.

Another object is the provision of a method of and means for making the same.

These and other objects as will hereinafter appear are accomplished by this invention which is fully described in the following specifications and shown in the accompanying drawings, in which Figure 1 is a partial perspective view showing a lamination being severed from a strip of electrical sheet steel;

Figure 6:
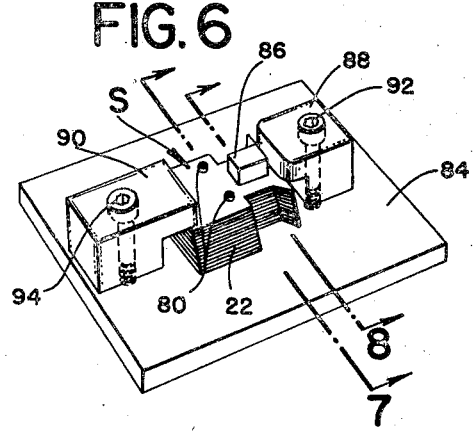
Fig. 6 is a perspective view of a jig for holding the lamination of one section in correct relation while completing the riveting operation.
Figure 7:
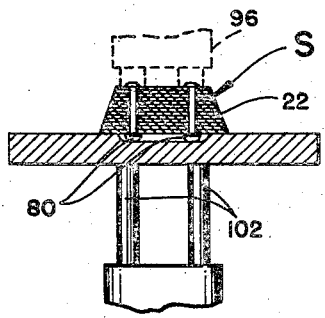
Figure 8:
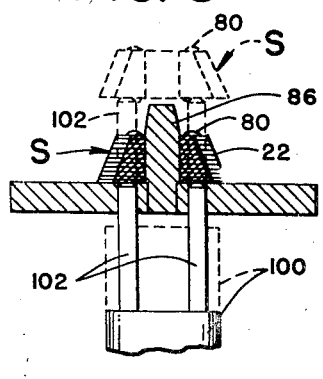
Figure 9:
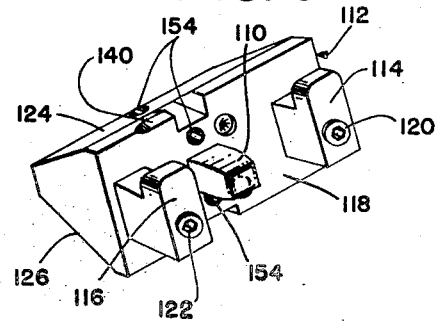
Figure 10:
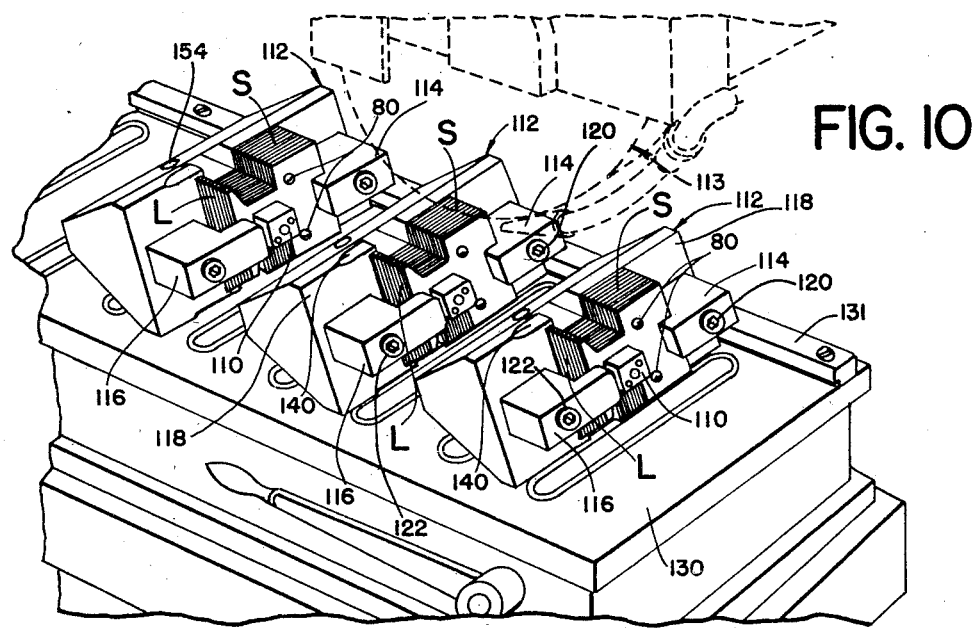
Figure 11:
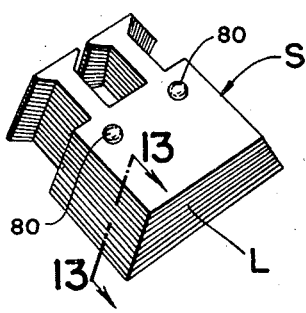
Figure 12:
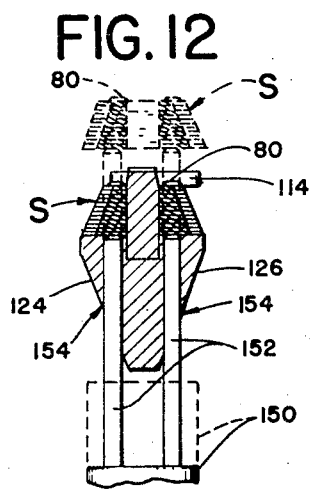
Figure 13:
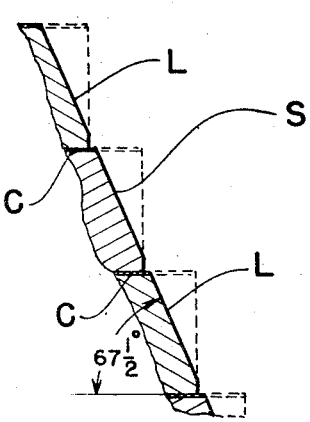

Figs. 7 and 8 are sections on the lines 7—7 and 8—8 respectively of Fig. 6;

Fig. 9 is a perspective view of a jig for grinding the prismatic sides of the section;

Fig. 10 is a perspective view of a magnetic chuck with a series of jigs like that shown in Fig. 9, each holding a prismatic section to be ground;

Fig. 11 is a perspective view of a finished prismatic core section;

Fig. 12 is a view of the jig of Fig. 9 showing means for removing the finished prismatic core section therefrom; and Fig. 13 is a greatly enlarged section on the line 13 through one edge of the finished prismatic core section.

The present invention relates to the trapezoidal core section S shown in Fig. 11 and to the method of manufacturing the same. This section, as is shown in Fig. 12, consists of a graduated series

2 of laminations L secured together by means of rivets 20 (Fig. 11).

Beginning now with Fig. 1, the various steps for making and assembling these graduated laminations to obtain the prismatic core section as in Fig. 11 will be described.

Figure 1:
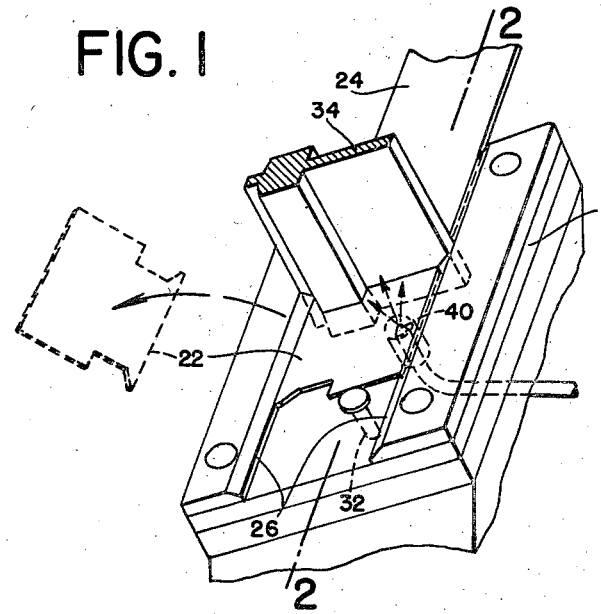

In Fig. 1 is shown a shear for shearing off a lamination 22. This is sheared from a straight strip 24 which is slid along a groove 26 in a die 27 until the end of the strip rests against a gauge pin 30 which has a stem 32 extending into the die. A shear 34 is moved up by means not shown so as to extend above the strip 24, permitting the strip to be slid endwise until it encounters the gauge pin 30, the center of which stands at a predetermined distance from the inner cutting edges of the shear 34.

The diameter of the head of this gauge pin fixes the distance the strip 24 can be advanced before the shearing operation takes place and therefore fixes the width W (Fig. 2) of the lamination 22 which is in an incomplete state, as here shown and as will presently be explained.

Figure 2:
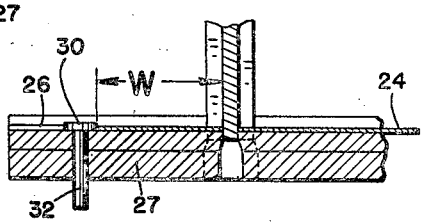
Fig. 2 is a partial, somewhat enlarged perspective view on the line 2—2 of Fig. 1.
Figure 5:
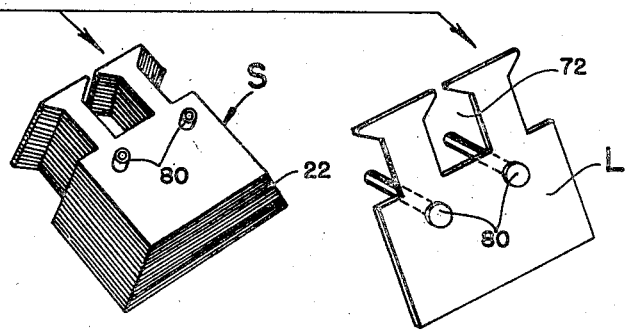
Fig. 5 is a perspective view of the outer or largest lamination with rivets inserted therein and also of a series of assembled laminations on these rivets, the whole making up a prismatic section of the stator.

By using gauge pins with heads 30 of different diameters, laminations 22 of different widths may be sheared off and these can be assembled in a graduated series, as shown in the upper part of Fig. 5 so as to provide a trapezoidal core section as there shown. The contour of the outer overlapping edges of all these laminations are identical since they are cut by the same shear blade 34, and they vary principally in width W as shown in Fig. 2.

After the shearing is accomplished, as shown in Fig. 1, the lamination 22, sheared off, is blown from the full line position to the dotted line position by means of an air jet 40 which is controlled, as will be readily understood, by a valve not shown, which is actuated only after shear 34 is lifted.

Figure 3:
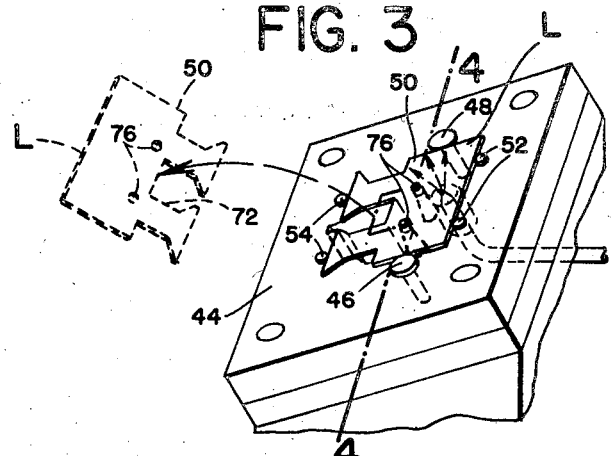
Fig. 3 is a perspective view of the die for punching holes in the laminations.
Figure 4:
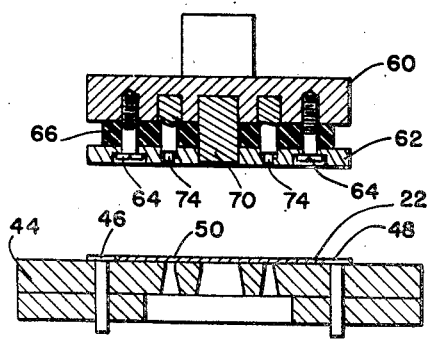
Fig. 4 is an enlarged perspective view of the die and punch of Fig. 3.

The next operation completes the shearing of the lamination as shown in Figs. 3 and 4. To do this I have provided a die 44 which has two spaced, parallel gauge pins 46, 48. The diameter of the heads of each pair of gauge pins is such as to just permit a lamination 50 of a particular width to be inserted between them while guide pins 52, 54 (Fig. 3) accurately position this lamination in the other direction.

Above the die lies a punch 60 as shown in Fig. 4 and which is moved up and down by apparatus well understood in this art but which is not here illustrated. This punch includes a pressure plate 62 guided by cap screws 64, 64, the pressure plate being yieldingly pressed downwardly by means of a block of rubber or the like 66. A central shearing element 70 serves to shear out the slot 72 in the lamination 50 while the shearing pins 74, 74 shear out the rivet holes 76. The shearing elements 70, 74 are normally below the lower surface of the pressure plate 62, but as the punch 60 descends this pressure plate first firmly grips the lamination to be punched and then shears out the rivet holes and the slot as shown in Fig. 3. The punch is then withdrawn.

By changing the gauge pin 30 of Fig. 1 and the gauge pins 46, 48 of Figs. 3 and 4, all the widths of lamination 22 may be formed for assembly of a prismatic core section as is shown in Figs. 5 and 11.

For the purpose of making these laminations, applicant prefers to use a high grade electric silicon sheet which is hard enough to insure a clean shear with no ragged edges in the form of a strip.

One of each width of lamination is now selected and assembled with rivets 80 (Fig. 5), the widths of the laminations being carefully selected so as to give the whole the effect of a prism. The high grade electric silicon sheet steel strip may be pre-coated on both sides with a good grade bonding cement designated by the letter C (Fig. 13) before punching the various widths of laminations. Then, they may be selected and assembled as in Fig. 5 using rivets or not and bonded together under suitable pressure and heat to form a solid body.

To insure these laminations being held in the proper juxtaposition during the setting of these rivets, I have provided a jig 84 (Fig. 6) which has a rigid central post 86 extending up through the central slots 72 while the tops and bottoms of the laminations are held down by means of clamps 88, 90, which are secured to the jig by means of screws 92 and 94 respectively.

While so held, a head 96 (Fig. 7) descends, riveting over the upper ends which are preferably hollowed out, thereby firmly securing together all the laminations 22 from the rough outline of the prismatic core section which, however, is still stepped as shown enlarged in dotted lines (Fig. 13). To strip this prismatic core section off the post 86, I have provided a plunger 100 (Fig. 8) which carries two pins 102 which lie, one on each side of the post 86, and midway thereof, so that as the plunger 100 moves from the full line position to the dotted line position, the core section S is lifted from the full line position to the dotted line position in which latter position it is entirely free of the post.

The operation of grinding these core sections will now be described: Each core section thus formed is mounted on a positioning post 110 of a grinding jig 112 (Fig. 9) and clamping fingers 114, 116 secured to the top face 118 of the grinding jig by means of clamping screws 120, 122 respectively. The post 110 is normal to the top surface 118 while inclined surfaces 124, 126 bear the same relation to each other as do the sides of the section S.

In Fig. 10 are shown three of the jigs 112, each carrying a laminated core section on its post 110 and holding it clamped by means of its clamping fingers 114, 116.

The grinding jigs 112 are made of steel and, as shown in Fig. 10, are firmly held on a magnetic chuck 130 and the end of said jig 112 abuts at 900 against a stop member 131 of said table 130, thus permitting a true alignment of said jigs. Since the bevel of the laminated core sections S have the same inclination as the inclined surfaces 124, 126 of the grinding jig, it will be apparent that when these jigs are placed on a flat table 130 of the magnetic chuck, the upper spaces of the core section will be substantially horizontal but will present a stepped, upper surface as is shown in the dotted line in Fig. 13 prior to the grinding operation. Grinding may then be done by means of a grinding wheel 132 (Fig. 10) in a well known manner so as to reduce the stepped edges to nearly a horizontal line as is shown in full line in Fig. 13. It is quite essential that the grinding is not carried quite to the bottom of the notches 134 between these stepped edges, otherwise burring will occur, carrying metal across from one lamination to the next, thus setting up unnecessary eddy currents between adjacent laminations. Each jig is provided on each side with an index surface 140 which enables the grinding to be done with great accuracy.

After the grinding operation is completed on one side, the jigs are then reversed and a similar grinding operation is performed on the opposite side, leaving both sides in the condition shown in full line in Fig. 13 in which each finished inclined surface extends at an angle of 67½° to that face of the core section which consists of the widest lamination. The section S is now removed from the jig 112 as shown in Fig. 12 by means of a plunger 150 having two parallel rods 152 extending up through holes 154 in the jig as shown in Figs. 9 and 12. On releasing the clamps 114, 116, plunger 150 can lift the core section off the positioning post 110.

Eight such core sections are then assembled in the form of an octagon to form a stator for an induction motor which is as shown and described in my co-pending application, Serial No. 695,516, filed September 7, 1946.

Thus, it will be seen that I have provided a very simple and efficient means for making a stator core section from a series of laminations of graduated widths, each lamination being insulated from the one next adjacent so as to eliminate to a large extent the hysteretic losses which are otherwise incident to a core of this type.

While I have shown and described but a few embodiments of my invention, it is to be understood that it is capable of many modifications. Changes, therefore, may be made which do not depart from the spirit and scope of my invention as disclosed in the appended claims.

I claim as my invention:

1. A prismatic section of a stator core for an induction motor made up of a graduated series of laminations of different widths secured together and having spaced slots formed in one end for the reception of field windings.

2. A prismatic section of a stator core for an induction motor made up of a graduated series of laminations of different widths riveted together and having spaced slots formed in one end for the reception of field windings.

3. A prismatic section of a stator core for an induction motor made up of a number of laminations lying transversely and secured together and having a median slot formed in one end and a half slot formed at each side and spaced therefrom so that when two such sections are assembled side by side a slot is formed therebetween for the reception of field windings.

4. A prismatic section of a stator core for an induction motor made up of a number of laminations lying transversely and riveted together and having a median slot formed in one end and a half slot formed at each side and spaced therefrom so that when two such sections are assembled side by side a slot is formed therebetween for the reception of field windings.

5. A prismatic section of a stator core for an induction motor made up of a number of laminations lying transversely and secured together and having a median slot formed in one end and a half slot formed at each side and spaced therefrom so that when two such sections are assembled side by side a slot is formed therebetween for the reception of field windings, the meeting prismatic faces of the section being ground to obtain a close and uniform fit therebetween.

6. A prismatic section of a stator core for an induction motor comprising a plurality of laminations of uniformly different widths secured together with the widest and narrowest laminations constituting opposite parallel prism faces and with the respective lateral edges of all the laminations aligned to form intermediate non-parallel prism faces.

7. A stator core section according to claim 6, in which the non-parallel prism faces each have a half slot at one end extending along the line of intersection of the intermediate face and one base of the prismatic section for cooperation with the corresponding half slot of an adjacent section to receive a field winding.

8. A stator core section according to claim 7, having a full slot in said one base between the half slots and spaced therefrom.

LEONARD E. ASKE.

REFERENCES CITED

The following references are of record in the file of this patent:

UNITED STATES PATENTS

| Number | Name | Date |
| --- | --- | --- |
| 522,344 | Kelly | July 3, 1894 |
| 1,737,128 | Ross | Nov. 26, 1929 |
| 1,756,672 | Barr | Apr. 29, 1930 |
| 2,304,607 | Sleeter | Dec. 8, 1942 |
| 2,329,151 | Brady | Sept. 7, 1943 |